United States Patent
Wolf

[19]
[11] Patent Number: 5,802,840
[45] Date of Patent: Sep. 8, 1998

[54] PROCESS FOR THE LOW-POLLUTANT CONVERSION OF FOSSIL FUELS INTO MECHANICAL POWER

[75] Inventor: Bodo Wolf, Freiberg, Germany

[73] Assignee: CRG Kohlenstoffrecycling GES.mbH, Freiberg, Germany

[21] Appl. No.: 702,544

[22] PCT Filed: Mar. 2, 1995

[86] PCT No.: PCT/EP95/00754

§ 371 Date: Sep. 6, 1996

§ 102(e) Date: Sep. 6, 1996

[87] PCT Pub. No.: WO95/24545

PCT Pub. Date: Sep. 14, 1995

[30] Foreign Application Priority Data

Mar. 8, 1994 [DE] Germany ............. 44 07 619.3

[51] Int. Cl.$^6$ .................................................. F02C 3/34
[52] U.S. Cl. ............................................ 60/39.02; 60/39.52
[58] Field of Search .......................... 60/39.02, 39.04, 60/39.07, 39.52

[56] References Cited

U.S. PATENT DOCUMENTS

| | | | |
|---|---|---|---|
| 3,736,745 | 6/1973 | Karig | 60/39.02 |
| 3,775,976 | 12/1973 | Karig | 60/39.52 |
| 4,434,613 | 3/1984 | Stahl | 60/39.07 |
| 4,498,289 | 2/1985 | Osgerby | 60/39.52 |
| 4,528,811 | 7/1985 | Stahl | 60/39.52 |

OTHER PUBLICATIONS

Schoeberl, "Prozesse und Komponten der Kraft–Waerme–Kopplung mit Gas–und Dampfturbinen", *Berichte Nr.*, No. 1065:1–11, (1993).

Charlier, "GuD–Kraftwerke in Der Kommunalen Kraft–Waerme–Kopplung", *Berichte Nr.*, No. 1065:87–107, (1993).

Perkavec, "Kraft–Waerme–Kopplungs–Anlagen in Der Industrie", *Berichte Nr.*, No. 1065:171–173, (1993).

*Primary Examiner*—Louis L. Casaregola
*Attorney, Agent, or Firm*—Foley & Lardner

[57] ABSTRACT

In a process for the low-pollutant conversion of thermal energy produced by burning fossil fuels into power, the thermal energy produced by burning fossil fuels is delivered directly to the cyclic process by virtue of the fact that in the cyclic process the fuels are burned with oxygen in the presence of carbon dioxide recycled from the cyclic process to form gas turbine operating substances having a temperature of from 800° to 1500° C. Furthermore, according to the invention, the pressure difference between the combustion chamber (1) and the carbon dioxide recycling process is compensated by condensation (11), on the one hand, and evaporation (4, 8) and pre-heating (3) of the carbon dioxide to be recycled and the combustion chamber (1), on the other, by compression (7) and expansion (6) which are performed during the process, preferably with a high-performance gas turbocharger (6, 7). The advantage of the process of the invention resides in the 10 to 20% reduction in the amount of exhaust gas to be discharged into the environment with respect to the prior art, and in the avoidance of nitrogen oxide with a degree of efficiency which is improved in terms of operational economy with respect to the prior art.

5 Claims, 2 Drawing Sheets

PROCESS FOR THE LOW-POLLUTANT CONVERSION OF FOSSIL FUELS INTO MECHANICAL POWER

BACKGROUND OF THE INVENTION

1. Field of the Invention

The invention relates to a process for the low-pollutant conversion of fossil fuels into mechanical power with the aid of expansion engines such as gas turbines and steam turbines as well as internal combustion engines.

The invention can be applied to the conversion of the chemical enthalpy of solid, liquid and gaseous fuels, for example bound to low-nitrogen combustion gases or fuel gases from solid fuels, refuse and biomasses, natural gas, fuel oil, gasoline, methanol, liquified gases and others, into mechanical power for driving generators for the generation of electrical energy, vehicles and working machines.

2. Description of Related Art

The state of the art of cyclic processes and expansion engines is very advanced and diversified. The most recent thermodynamic process combinations of power station technology are described, inter alia, in the VDI Report 1065 of September 1993. In the state of the art, a distinction is still being made between open and closed power processes which operate with different working media.

The advantage of the closed cyclic processes is that these can utilize the enthalpy fed to the cyclic process down to the level of the ambient temperature. The obstacle is that the process energy must be fed to the cyclic process by indirect heat transfer, which is associated with a high energy loss.

In open cyclic processes, as in gas turbine processes, the process energy is fed in directly by integrated combustion. To this end, open cyclic processes have the disadvantage that a considerable fraction of the process energy fed in is removed from the cyclic process with the working medium.

Advantages and disadvantages of the open and closed cyclic processes have led to the coupling of open and closed cyclic systems by indirect heat transfer. The best-known combinations are the gas/steam power stations.

Such a gas turbine process is known, for example, from U.S. Pat. No. 4,434,613. In this process, fossil fuel is burned in a combustion chamber of a gas turbine with oxygen which is fed by means of the compressor of the gas turbine installation as a mixture with recycled gas turbine exhaust gas. The gas turbine exhaust gas is, before its processing to give liquid carbon dioxide or recirculation, cooled in a waste heat boiler which generates steam for a steam turbine.

Water is the most widely used working medium for closed power processes. The disadvantage of these power processes operating with water as the working medium is the mean temperature level of the heat supply to the process, since the high heat capacity of vaporization strongly influences and lowers the mean temperature of the heat supply. This specific defect of the working medium is partially compensated by the design of processes with supercritical states of steam. This is tied, however, to steam pressures of around 25.0 MPa and higher, which limits the possible steam temperature to less than 600° C.

The most widely used working medium for open cyclic processes, such as are designed with gas turbine installations, is air. A gas, that is to say in most cases air at ambient parameters, is fed to the cyclic process, the gas being compressed in the cyclic process and its temperature then being raised by combustion of a fuel with excess oxygen. The subsequent expansion drives a mechanism which provides mechanical power, lowers the pressure and the temperature of the working medium which is released with at least ambient pressure from the cyclic process into the surroundings, the temperature of the working medium being in most cases much higher than that of the surroundings.

Even with the most modern process design, both steam power processes and gas turbine processes reach, due to their working media, net power station efficiencies of about 40% individually and up to 50% in combination.

Most thermal power stations provide the requisite process heat by the combustion of fossil fuels. This generates carbon dioxide and water vapor as well as sulfur oxides and nitrogen oxides as pollutants which must be removed from the exhaust gases by expensive flue gas purification processes.

A characteristic of all power processes which provide their process heat by the combustion of fossil fuels is that the nitrogen content in the air - used as combustion gas and/or working medium—causes the largest ballast mass flow passing through the process.

The atmospheric nitrogen is responsible for a considerable part of the heat loss of the power processes and the formation of nitrogen oxides. If solid fuels are to be used as energy carriers for open power station processes, it is necessary to gasify these or to burn them under pressure. The advantage of gasification over combustion is that the quantity of gas to be purified is substantially smaller, so that the pollutant load for the environment can be reduced via the gasification.

On the other hand, the efficiency of the power process and hence the specific fuel consumption is decisive for the reduction in the emission of carbon dioxide. Like U.S. Pat. No. 4,434,613 and others, U.S. Pat. No. 4,498,289 thus also proposes a gas turbine process which uses, as working medium, a gas mixture rich in carbon dioxide, which is produced by the combustion of fossil fuels with technical oxygen. Whereas, in U.S. Pat. No. 4,434,613, the waste heat of the gas turbine exhaust gas is released to a steam process, U.S. Pat. No. 4,498,289 proposes to use that part of the gas turbine waste heat which arises at high temperature for the recuperative preheating of the recirculated working medium, while the low-temperature waste heat and the heat of compression are transferred to cooling water and removed from the process. For this purpose, U.S. Pat. No. 4,498,289 prescribes that the working medium is, downstream of the gas turbine and the compressor, not cooled to below the said temperature of 31° C., and the compression of the working medium downstream of the gas turbine is taken to supercritical level, so that an isothermal condensation of the carbon dioxide in the subcritical region is avoided with certainty. Supercooling of the working medium to 27° C. under supercritical parameters is permitted only for the purpose of separating off non-condensible gases from the cyclic process. These stipulations have the consequence that, according to the second main theorem of thermodynamics, the unavoidable removal of the energy [sic] from the cyclic process takes place at a high mean temperature level, and the utilization of the power capacity of the working medium is unsatisfactory. The decisive defect of U.S. Pat. No. 4,498,289 is, however, that the proposed concepts conflict with the second main theorem of thermodynamics and are therefore technically not feasible. This concerns the temperature differences in the heat transfer, the internal efficiencies of the turbo-engines and the pressure losses in the cyclic process. In particular, this concerns the exemplary embodiment shown in FIGS. 3 and 4, since it integrates a recuperator (item 126) which releases more heat than is supplied to it, and feeds the gas to the turbine (116) at a temperature which is above that of the gas turbine exhaust gas available for the heat transfer.

Finally, U.S. Pat. No. 3,736,745 discloses a cyclic process with carbon dioxide as the working medium, with combustion of oxygen with fuel for a recuperation gas turbine, wherein the turbine exhaust gas is, after cooling in the recuperator, fed directly to a condenser and liquified therein. The gas turbine must therefore continuously maintain the pressure required for the condensation. This has the result, however, that the specific power capacity relative to $CO_2$ is low, so that a very large mass flow must be circulated, which requires large installations and high pump rating and lowers the efficiency.

SUMMARY OF THE INVENTION

The object of the invention as compared with the state of the art is the provision of a power process whose energy efficiency is comparable with the best gas/steam power station processes of the state of the art but which, compared with the latter, releases only 10 to 20% exhaust gas, which is virtually free of nitrogen oxides, to the environment and is operationally more efficient.

This object is achieved by a process having the features of the main claim, and preferred embodiments are to be found in the subclaims.

DETAILED DESCRIPTION OF A PREFERRED EMBODIMENT

Figure 1:
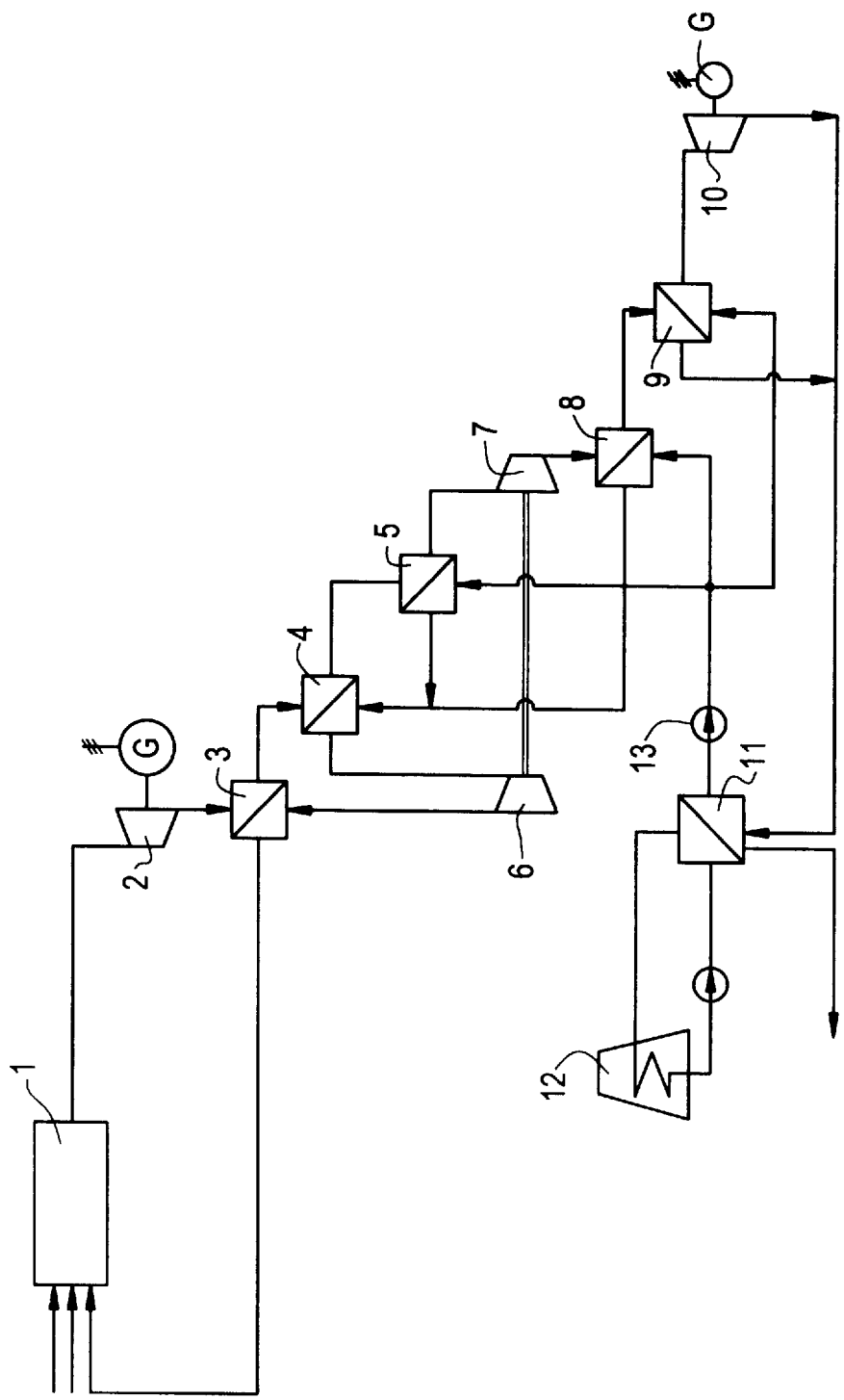
FIG. 1 refers to an outline engineering diagram of a gas turbine installation according to the present invention.

In this process, fossil gaseous, liquid or solid fuels or fuel gases produced from these are burned in a combustion chamber under a pressure of preferably 8.0 MPa with technical oxygen, for example from air separation, in the presence of recirculated, regeneratively preheated carbon dioxide. With the aid of the recirculated carbon dioxide, the combustion temperature in the combustion chamber of the internal combustion engine is adjusted or [sic] to the permissible gas inlet temperature of the gas turbine downstream of the combustion chamber and the exhaust gas from the engine or the gas turbine is used for recuperative preheating of the carbon dioxide which is to be recirculated, before, cooled down to the vicinity of the ambient temperature, its pressure is raised to at least 7.2 MPa by compression, so that, after renewed lowering of its temperature to the vicinity of the ambient temperature, it condenses below a temperature of 30° C. with release of heat to a heat sink, which can also be the vaporizer of a refrigerating machine. The fractions of water vapor, carbon oxides, nitrogen oxides and sulfur oxides, formed by the combustion of the fuel in the combustion chamber, and non-condensible gases, introduced with the fuel and the technical oxygen, are discharged from the cyclic process in the gaseous, solid or liquid form during the cooling of the engine or gas turbine exhaust gas and/or the condensation of the carbon dioxide which is to be recycled. According to the invention, the liquified carbon dioxide is raised by means of a pump to a pressure of preferably 40 MPa, vaporized in the recuperators in countercurrent for cooling the gas turbine exhaust gas and preheated before its pressure is reduced in the engine or in a turbine or other expansion engines, with production of mechanical power, to the pressure of the combustion chamber and fed to the latter. The compression of the cooled engine or gas turbine exhaust gas to the condensation pressure and the expansion of the vaporized and preheated carbon dioxide, which is recirculated in the cyclic process, can be carried out according to the invention a high-performance gas turbocharger, in which the turbine is coupled directly to the compressor, or another machine, for example a reciprocating machine, in which expansion and compression are directly coupled.

The equipment used for the implementation of the invention can, however, also be a two-stage gas turbine which directly couples, on one shaft, a modified highpressure steam turbine, such as is known from power station technology, with a high-temperature gas turbine and a compressor for compressing the cooled gas turbine exhaust gas to the condensation pressure, the combustion chamber, which provides the energy, being located between the high-pressure steam turbine and the gas turbine.

It is also in accordance with the invention to transfer heat of compression from the process-integrated compression of the cooled gas turbine exhaust gas to the condensation pressure in another cyclic process which preferably likewise uses carbon dioxide as the working medium and produces heating energy or mechanical power.

The useful effect of the invention is that waste heat from the expansion in internal combustion engines or gas turbines is recycled into the cyclic process and used for the thermal compression of the working medium, so that the proportion of mechanical compression work in the cyclic process is reduced and the specific output of the machines is consequently increased, with a simultaneous reduction in the exhaust gas volume and the discharge of nitrogen oxides by up to 90% as compared with the state of the art.

Exemplary Embodiment 1

The invention is described by reference to the outline engineering diagram, shown in FIG. 1, of a gas turbine installation. [lacuna] A combustion space (1), which in practice can be a combustion chamber of a gas turbine, fuel which, in the example, is to consist of 100% of methane is burned under a pressure of 8.0 MPa with technical oxygen which has an oxygen content of at least 93% by volume.

By feeding in preheated carbon dioxide, the temperature of the combustion in the combustion space (1) is reduced, so that hot working medium at 1200° C. is released from the combustion to the expansion process (2), a gas turbine in the example.

4.3 kg of technical oxygen and 70 kg of carbon dioxide, regeneratively preheated to 755° C., per kg of methane burned are fed to the combustion in the combustion space (1).

The hot combustion gas at 1200° C. expands in the gas turbine (2) to 1.5 MPa. In this way, a gas turbine can, at an exhaust gas temperature of about 920° C., release about 27.35 MJ of mechanical power per kg of methane. The exhaust gas transfers, in a first recuperator (3), a part of its enthalpy in countercurrent to circulating gas, carbon dioxide in the invention, before the latter is passed at a temperature of about 755° C. into the combustion chamber (1). The circulating gas is obtained in liquid form in a second recuperator (11) by condensation of carbon dioxide under a pressure of 7.2 MPa out of exhaust gas cooled to ambient temperature. The heat thus released is discharged to the surroundings by the heat sink (12) [sic].

At the same time, gaseous carbon dioxide and noncondensible constituents are discharged to the surrounding from the recuperator (11) at the rate at which they were fed to the combustion chamber (1) together with the fuel and the technical oxygen.

The circulating gas, liquid carbon dioxide in the example, is pressurized by means of a pump (13) to 33.0 MPa and vaporized in the recuperators (8 and 4) under supercritical parameters and superheated to 510° C., before it is expanded in the turbine (6), for example a gas turbocharger, to about 360° C. with production of mechanical power to approximately the working pressure of the combustion chamber (1) of 8.0 MPa.

When a gas turbocharger is used, the turbine (6) directly drives the compressor (7) of the same turboloader, by means of which the pressure of the exhaust gas cooling in recuperators (3, 4 and 5) is raised to such an extent that, allowing for the pressure losses of the renewed cooling in the recuperators (8 and 9), the required condensation of the carbon dioxide in the recuperator (11) can take place.

While the exhaust gas is cooled down in the recuperators (8 and 9), the water formed in the combustion of the fuel in the combustion chamber (1) condenses out. It is released to the surroundings via condensate traps.

The whole of the heat to be removed in the recuperator (9) can be released as heating energy to a consumer or a low-temperature cyclic process which provides further mechanical power by means of the recuperator (11) and a turbine (10).

The power process, described in the example, according to the invention achieves a gross output of mechanical work of 62.3%, in relation to methane. Allowing for the state of the art in the air separation plants, it is possible to erect a power station having a net efficiency of 50%.

Exemplary Embodiment 2

Figure 2:
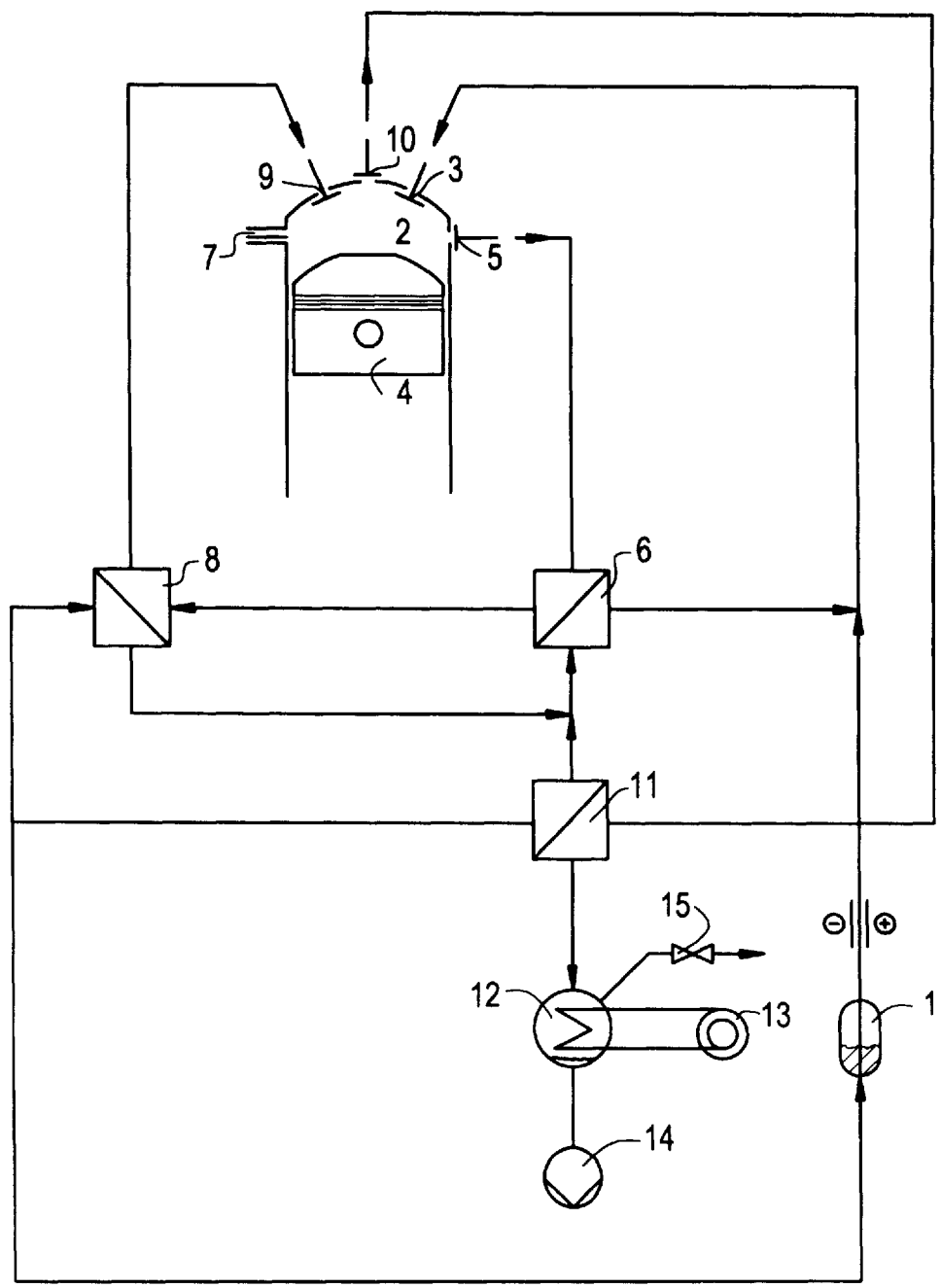
FIG. 2 refers to an outline engineering diagram of a 4-stroke internal combustion engine according to the present invention.

The reference numerals mentioned in Exemplary Embodiment 1, refer to FIG. 1 and the reference numerals mentioned in Exemplary Embodiment 2, refer to FIG. 2.

The use of the invention is described by reference to FIG. 2, taking a 4-stroke internal combustion engine as an example.

The process is transferred into a cyclic operating state by means of a starting system (1) which stores liquid carbon dioxide at pressures of between 20 and 40 MPa and, after it has been taken out, vaporizes it by indirect supply of heat and superheats it to 300° to 600° C.

The carbon dioxide taken from the starting system is fed to the working cylinder (2) of the internal combustion engine via the 1st inlet valve (3) with the piston (4) positioned in the vicinity of its top dead center, and the working cylinder (2) is charged, thus starting the 1st working stroke of the cyclic process. In cyclically steady operation, the charging is effected by feeding of carbon dioxide at, for example 30 MPa and 550° C. from the 1st recuperator (6).

The carbon dioxide fed in via the 1st inlet valve (3) expands in the working cylinder (2) to 2.0 to 3.0 MPa, releasing mechanical power to the piston (4). At this pressure level, engine fuel of a known type and technical oxygen are injected via injection jets (7) into the working cylinder (2) and are burned therein by self-ignition or spark ignition. The combustion gas forming in the working cylinder (2) with a rise in pressure and temperature is expanded to 0.3 to 1.0 MPa, likewise with the release of mechanical power to the piston (4). This pressure level is reached at the end of the 1st working stroke with the piston (4) positioned in the vicinity of its bottom dead center.

In the 2nd working stroke, the piston (4) moves from the bottom to the top dead center and forces the expanded combustion gas at 500° to 700° C. and 0.3 to 1.0 MPa out of the working cylinder (2) via the 1st outlet valve (5), the 1st recuperator (6) and the 2nd recuperator (8) back to the 2nd inlet valve (9).

In the recuperators (6) and (8), the combustion gas is cooled to 40° to 500° C.

In the 3rd working stroke, the piston (4) aspirates the cooled combustion gas via the 2nd inlet valve (9) into the working cylinder (2) by moving again from the top dead center to the bottom dead center. When the piston (4) is positioned in the vicinity of the bottom dead center, the 2nd inlet valve (9) closes and terminates the 3rd working stroke.

In the 4th working stroke, the aspirated combustion gas in the working cylinder (2) is compressed, with the inlet valves (3) and (9) and outlet valves (5) and (10) closed, by the piston (4) moving from the bottom dead center to the top dead center. At a pressure of 60 to 80 bar, which is necessary for the condensation of carbon dioxide at normal ambient temperature, the 2nd outlet valve (10) opens and the piston (4) delivers the compressed combustion gas to the 3rd recuperator (11) in which the combustion gas is cooled to 40° to 50° C. in countercurrent to liquid carbon dioxide from the condenser (12), before at least the same quantity of carbon dioxide as is required for the recirculation is condensed out of the combustion gas in the condenser (12) by release of heat to a heat sink (13).

At the end of the 4th working stroke, the piston (4) is at top dead center, the 2nd outlet valve (10) closes, and the cycle starts anew.

The required carbon dioxide pressure for starting the 1st working stroke, for example 30 MPa, is assured by the condensate pump (14).

The substances fed to the cyclic processes with the fuel and the technical oxygen are removed out of the cyclic process from the condenser (12) via a valve (15).

I claim:

1. A process for the low-pollutant conversion of a fossil fuel into mechanical power with the aid of an expansion engine comprising:

providing an expansion engine;

burning fossil fuel in the presence of oxygen and recycled carbon dioxide and expanding the burned fossil fuel in the expansion engine to produce mechanical power;

removing expanded exhaust gas from the expansion engine;

cooling the expanded exhaust gas in a heat exchanger;

increasing pressure of the expanded exhaust gas;

cooling the expanded exhaust gas in further heat exchangers to below 30° C.;

liquifying the expanded exhaust gas;

purging non-condensable fractions from the expanded exhaust gas;

removing a portion of liquid $CO_2$ from said process;

recycling remaining portions of the liquid $CO_2$ to the process as a circulating gas;

vaporizing said remaining portions of the liquid $CO_2$ by heat exchange with the expanded exhaust gas; and cooling the process to a temperature between 800° to 1500° C. with the vaporized $CO_2$.

2. A process according to claim 1, wherein the vaporizing step is carried out at a pressure of about 40 MPa.

3. A process according to claim 1, wherein the expansion of the burned fossil fuel and said increasing pressure step are carried out with the aid of a turbocharger.

4. A process according to claim 3, wherein the expanded exhaust gas is fed to a gas turbine and the exhaust gas is cooled stepwise in a plurality of recuperators against recycled circulating gas prior to employing said turbocharger.

5. A process according to claim 1, wherein the increase in pressure is to at least 7.2 MPa.

* * * * *